United States Patent [19]
Wicke

[11] 3,842,854
[45] Oct. 22, 1974

[54] HEAT RESPONSIVE SAFETY DEVICE FOR MANUAL GATE VALVE OPERATORS

[75] Inventor: Charles H. Wicke, Richmond, Tex.
[73] Assignee: ACF Industries, Incorporated, New York, N.Y.
[22] Filed: Apr. 16, 1973
[21] Appl. No.: 351,736

[52] U.S. Cl. .................................. 237/77, 251/14
[51] Int. Cl. ........................................... F16k 17/38
[58] Field of Search ............................. 137/72–77; 251/14

[56] References Cited
UNITED STATES PATENTS
| | | | |
|---|---|---|---|
| 2,035,497 | 6/1934 | Morse | 137/77 |
| 2,997,052 | 8/1961 | Mangini | 137/77 |
| 3,706,321 | 9/1971 | Vicari | 137/554 |

Primary Examiner—Alan Cohan
Assistant Examiner—Richard Gerard
Attorney, Agent, or Firm—Eugene N. Riddle

[57] ABSTRACT

A heat responsive safety device for a manual gate valve operator which is employed in combination with a pneumatic actuator and is effective when the pneumatic system has been overridden by the manual operator. The safety device includes releasable locking means comprising an inner cap on which the manual gate valve operator is connected. The inner cap is releasably held within an outer sleeve by a plurality of spherical ball members which are received within a recess to permit release of the inner cap and the manual gate valve operator thereon upon the melting of a fusible material. The member having the recess therein moves under the bias of the valve stem upon melting of the fusible material and positions the recess adjacent the spherical ball members for receiving the ball members. Upon release of the inner cap and manual operator, the valve stem is released for movement of the gate valve to a closed position.

3 Claims, 6 Drawing Figures

HEAT RESPONSIVE SAFETY DEVICE FOR MANUAL GATE VALVE OPERATORS

BACKGROUND OF THE INVENTION

Applicant's co-pending application Ser. No. 319,123 filed Dec. 29, 1972 discloses a heat responsive safety device for a pneumatically actuated gate valve including an inner cap held within an outer cap by a plurality of spherical ball members. A fusible material is positioned within the inner cap and upon melting permits release of the spherical ball members from engagement with the outer cap and thereby effecting release of the inner cap. Thereupon the valve stem is released for movement of the gate valve to a closed position. The aforesaid co-pending application does not show a manual handwheel override which may be employed to override the pneumatic system for opening the valve such as might be desirable, for example, upon a malfunctioning of the pneumatic system and movement of the valve to a closed position.

BRIEF DESCRIPTION OF THE INVENTION

The present invention has a manual handwheel override to move the gate to an open position after the gate has moved to a closed position such as might result from malfunctioning of the fluid system for a fluid actuator. The handwheel override is employed in combination with a fluid actuator which normally controls the movement of the gate valve and the override moves the gate valve to an open position independently of the fluid actuator. A releasable heat responsive connection is provided between the override structure and the fluid actuator and upon the reaching of a predetermined high temperature when the handwheel override is in engagement with the gate valve the override structure is separated from the fluid actuator and permits the gate valve to move to a closed position. The releasable connection includes a plurality of spherical ball members forming releasable locking members between the override and an outer sleeve on the fluid actuator. A fusible material is under compression from the outward thrust of the valve stem when the override is in engagement with the gate valve and upon reaching a predetermined high temperature the fusible material fuses and flows through a metering opening to permit an outward movement of the handwheel override. The initial outward movement of the handwheel override aligns a receiving groove with the spherical ball members to receive the spherical ball members for releasing the connection between the override structure and the fluid actuator to permit detachment of the override structure from the fluid actuator. Thereupon the outward thrust of the valve stem moves the gate valve to a closed position.

Thus, a manual override structure is detachably mounted on the outer wall of the cylindrical housing for a fluid actuator and may be employed to move the gate valve to an open position upon any malfunctioning of the fluid actuator. Upon a predetermined high temperature being reached while the gate valve is being held open by the override structure, a fusible material under a compressive force from the stem thrust melts and permits an outward movement of the override structure relative to the fluid actuator. Upon such outward movement, the locking members comprising spherical ball members are disconnected from the fluid actuator and the entire handwheel override structure is detached or falls away from the fluid actuator.

The invention accordingly comprises a construction hereinafter described, the scope of the invention being indicated in the following claims.

In the accompanying drawings, in which one of various possible embodiments of the invention is illustrated, FIG. 1 is a sectional view of gate valve structure illustrating the gate and fluid actuator therefor in the open position of the gate valve with the manual override structure being actuated and engaging the valve stem to hold the gate in open position;

Figure 1:
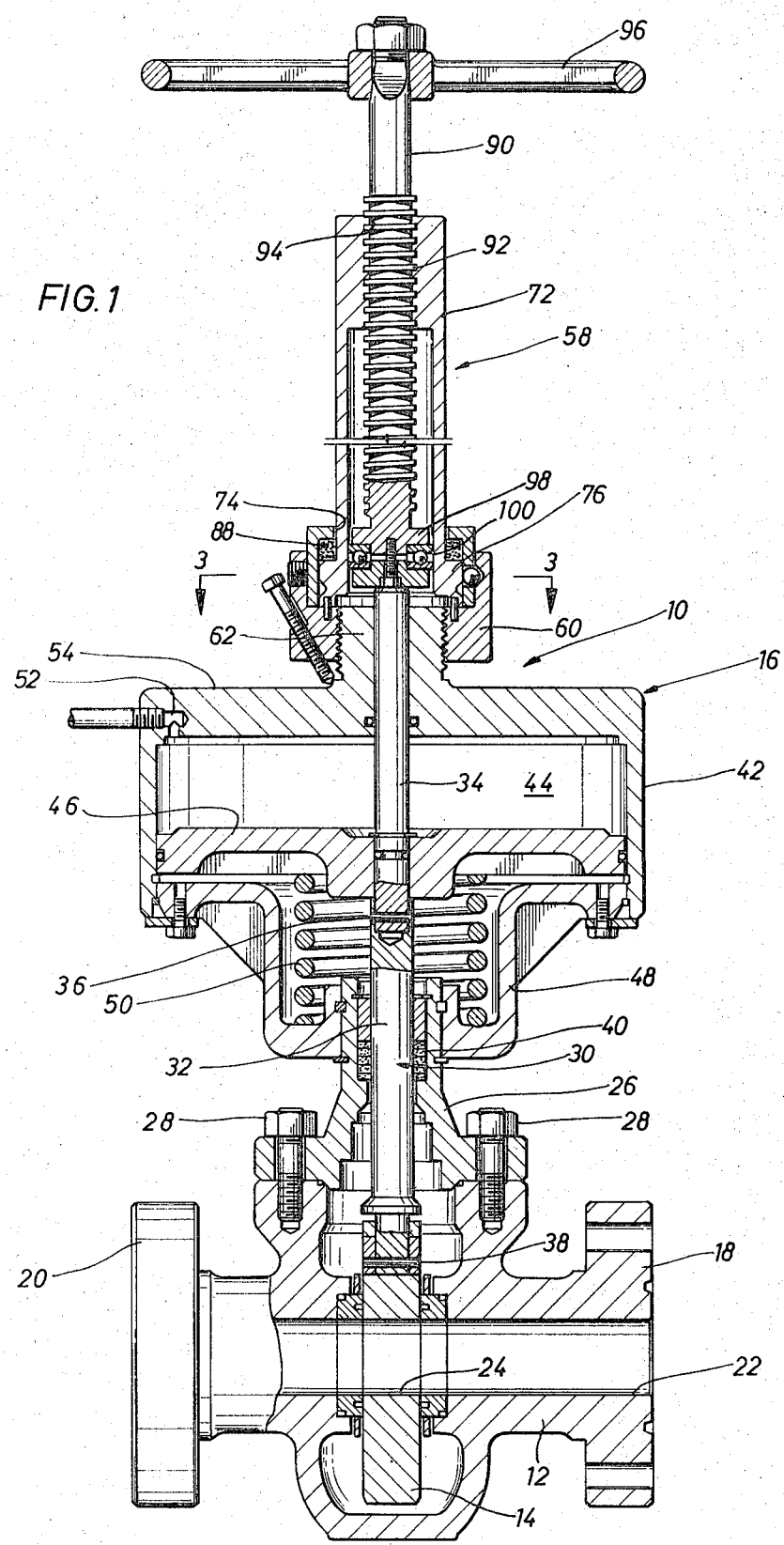

Referring to the drawings, the valve structure generally indicated 10 includes a valve body 12, a gate 14, and a fluid actuator generally indicated 16 which moves gate 14 between open and closed positions. Valve body 12 has flanges 18 and 20 which are adapted to be connected to a flowline (not shown), and a bore 22 extends through body 12 in alignment with port 24 in gate 14 when gate 14 is in open position.

A bonnet 26 is connected by suitable nut and bolt arrangements 28 to valve body 12. Valve stem generally indicated 30 has a lower stem portion 32 and an upper stem portion 34 connected thereto by retainer pin 36. Lower stem portion 32 is connected to gate 14 by retainer pin 38. A stem packing 40 in bonnet 26 extends about lower stem portion 32. Actuator 16 includes a cylinder 42 having a fluid chamber 44 and a piston 46 secured to upper stem portion 34 for movement therewith. Base 48 houses a spring 50 therein which engages the inner surface of piston 46 to urge continuously piston 46 outwardly to the closed position of gate 14. A suitable source of fluid may be provided through bore 52 in the upper portion of outer end wall 54 of cylinder 42. All the above construction comprises conventional gate valve structure. It is to be understood that actuator 16 may be operated either by gas or liquid.

The present invention is directed particularly to the handwheel override structure generally indicated 58 which is carried by outer sleeve 60 threaded onto externally threaded extension 62 of cylinder end wall 54. Sleeve 60 has a central opening 63 therein and an annular groove 64 about its inner surface. Mounted within central opening 63 of sleeve 60 is an inner cap generally indicated at 66. Inner cap 66 has a plurality of openings 68 positioned adjacent groove 64. Spherical ball elements 70 are mounted within openings 68 and are of a diameter greater than the wall thickness of inner cap 66. For example, wall thickness of cap 66 may be around one-quarter inch with a diameter of three-eighths inch for spherical ball elements 70. Thus, spherical ball elements 70 project within groove 64 in sleeve 60 to hold inner cap 66 in a locked position on sleeve 60.

Handwheel override 58 has an outer housing 72 extending within a central opening 74 of cap 66. An enlarged cylindrical end portion 76 of housing 72 has an annular groove 78 extending about the outer circumference thereof. Pins 80 secured to outer sleeve 60 are received within openings 82 within the inner surface of cylindrical end portion 76. Pins 80 prevent any rotation of housing 72 and cylindrical end portion 76 relative to fluid actuator 16. A shoulder 84 is formed by the inner surface of the cylindrical end portion 76. Mounted between shoulder 84 and inner end surface 86 of cap 66 is an annulus 88 of a eutectic material which fits about housing 72 and is seated on shoulder 84. A predetermined clearance between housing 72 and the surface defining opening 74 in cap 66 is provided and may preferably be around .015 inch. The clearance of .015 inch permits a metering of the fusible material upon fusing or melting thereof at a predetermined high temperature. Ball members 70 are of a diameter greater than the wall thickness of cap 66. As shown in the drawings with fusible material 88 positioned between shoulder 84 and inner surface 86 of cap 66, a portion of ball members 70 projects within groove 64 to hold cap 66 in locked position on sleeve 60. Valve stem 34, which may have a thrust load thereon as high as 20,000 pounds, for example, urges cylindrical end portion 76 and shoulder 84 against fusible material 88 and fusible material 88 transmits the load to cap 66. Inner cap 66 transmits the load to ball members 70 and sleeve 60. In order for ball members 70 to be received in groove 78 which permits release of cap 66 and handwheel override structure 58 from sleeve 60, cylindrical end portion 76 must move upwardly a distance of around three-eighths inch, for example. Thus, the thickness of fusible material 88 must be at least equal to three-eighths inch and preferably is around one-half inch.

As a specific but non-limiting example of fusible material 88, a material sold under the name "Cerrocast" by Cerro Copper and Brass Company, Bellefonte, Pa. has been found to be satisfactory. The Cerrocast fusible material comprises 60% tin and 40% bismuth and has a yield temperature of 302° F. The Cerrocast material will commence to break down or creep at 280° F. and will melt or be metered from the clearance between housing 72 and the surface defining opening 74. It is to be understood that the time required for the melting of fusible material 88 will depend on various factors, such as the type of fusible material employed, the intensity of the temperature, the size of openings through which the fusible material is metered, the thickness of the fusible material, and the amount of movement required for the cylindrical end portion 76 before release of cap 66 from sleeve 60. Such factors may be varied to provide the desired temperature at which failure will occur in material 88 and the reaction time required for such failure.

A handwheel operator shaft 90 has external screw threads 92 in engagement with internal screw threads 94 of cylindrical housing 58. A handwheel 96 is secured to the outer end of shaft 90. An enlarged inner end portion 98 has ball bearing members 100 mounted between races 102 and 104. An end cap 106 is secured by screw 108. Enlarged portion 98 of stem 90 contacts valve stem 34 and upon rotation of handwheel 96 will move valve stem 34 and gate 14 to an open position thereof.

Referring to FIG. 1, handwheel override mechanism 58 is shown in engagement with valve stem 34 with gate 14 moved to an open position by rotation of handwheel 96. This might occur, for example, upon a malfunctioning in the fluid system for cylinder 42 whereby gate 14 may be moved to closed position under the bias of spring 50 such as, for example, shown in FIG. 2. Upon rotation of handwheel 96 from the position shown in FIG. 2, gate 14 will be moved to open position under the driving force of handwheel override 58 as shown in FIG. 1.

Figure 2:
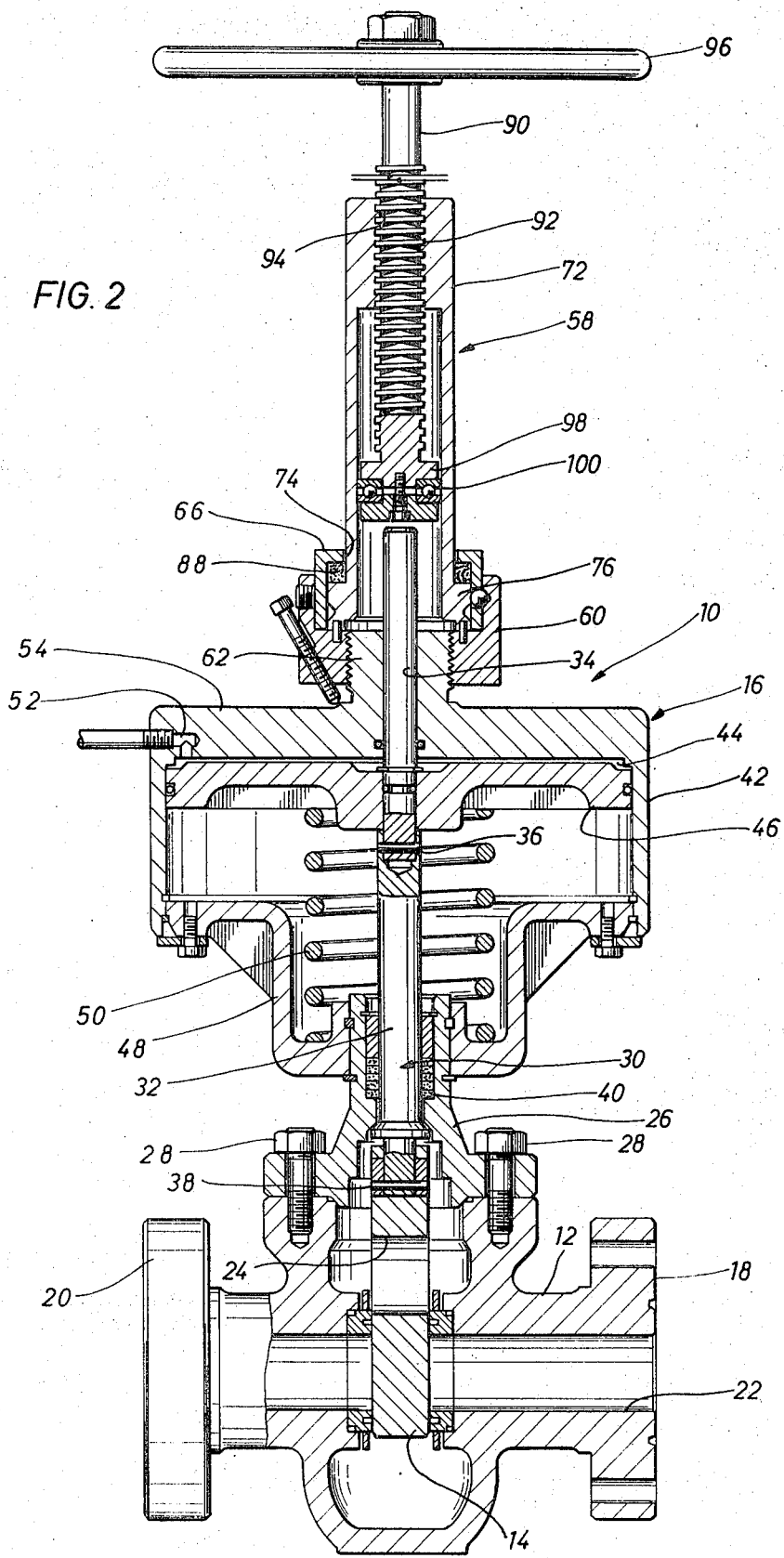
FIG. 2 is a sectional view of a gate valve structure similar to FIG. 1 but showing the gate in the closed position thereof before actuation of the manual handwheel override.
Figure 3:
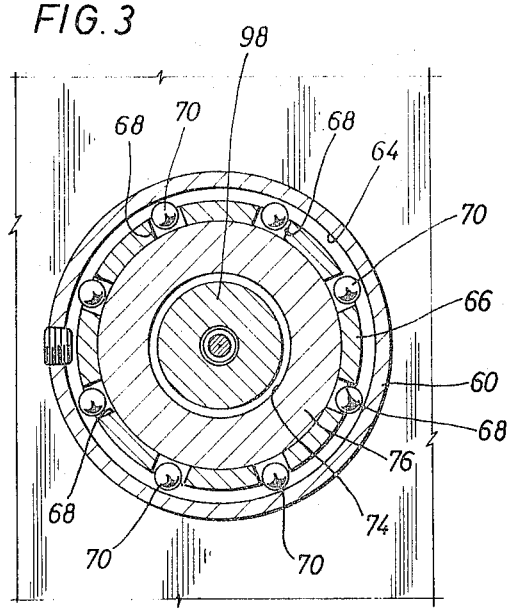
FIG. 3 is a section taken generally along line 3—3 of FIG. 1 and showing the spherical ball elements holding the override structure in engagement with the fluid actuator.
Figure 5:
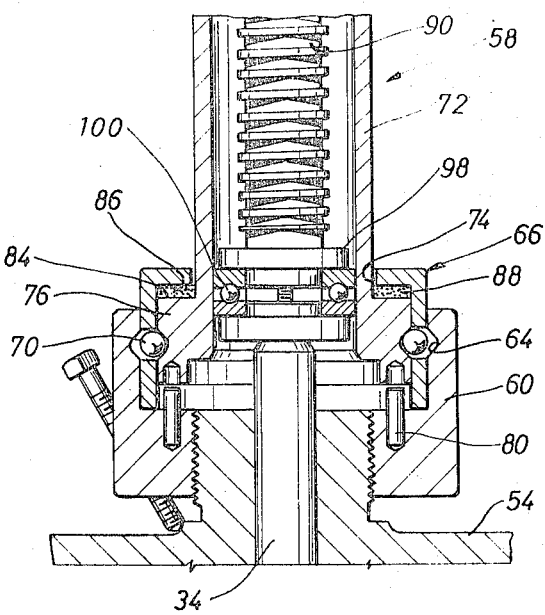
FIG. 5 is a fragment of FIG. 4 but showing the fusible material after fusing and melting thereof to permit an outward movement of the handwheel override structure relative to the fluid actuator.
Figure 4:
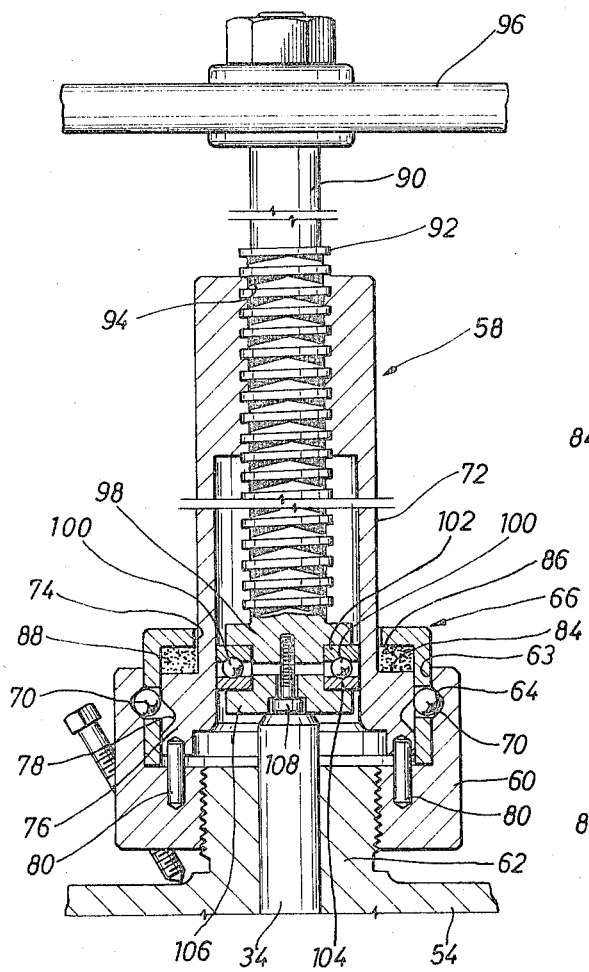
FIG. 4 is an enlarged view of the manual handwheel override in the open position of the gate and illustrating the fusible material before any destruction thereof.
Figure 6:
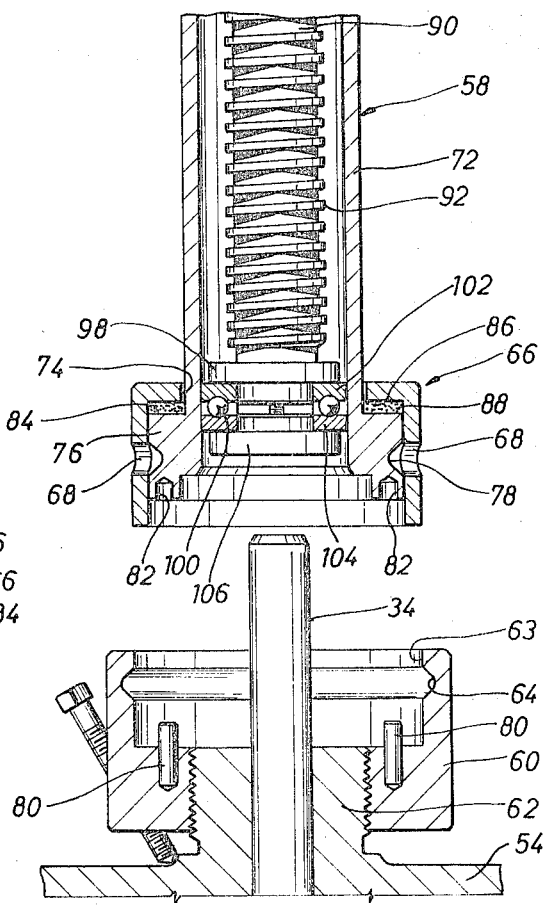
FIG. 6 is a view similar to FIGS. 4 and 5 but showing the handwheel override structure released from engagement with the fluid actuator with the valve stem moved to the closed position of the gate.

In the position of FIG. 1, if a fire or the like occurs adjacent valve structure 10 and the temperature reaches an intensity of over 300° F., for example, fusible material 88 will melt after a period of time and will be metered through the clearance provided between housing 72 and the surface defining opening 74. Upon the loss of volume of fusible material 88, cylindrical end portion 76 is forced upwardly from the thrust of stem 34 and upon moving outwardly a distance of around three-eighths inch, for example, groove 78 is positioned adjacent ball elements 70 and ball elements 70 are received in groove 78 as shown in FIG. 5. In this position, ball elements 70 are removed from groove 64 and the outer thrust of stem portion 34 pushes the handwheel override 58 out of sleeve 60 as clearly shown in FIG. 6. In this position, gate 14 has moved to the closed position as shown in FIG. 2 under thrust of stem 34.

What is claimed is:

1. A gate valve structure comprising, a valve body, a gate valve movable between open and closed positions in said body, a cylindrical housing on the valve body having a piston mounted therein to provide a fluid actuator, a stem connected to said piston and said gate valve and movable therewith, a threaded extension on said cylindrical housing having a center opening therein receiving the valve stem, an outer sleeve threaded on said extension, means continuously biasing the piston and stem toward a closed position of the valve, a manual override structure connected to said outer sleeve for manual operation of the gate valve to open position independently of the fluid actuator, said manual override structure including a movable operator shaft operatively connected to the stem, a handwheel operatively connected to the operator shaft and effective upon rotation thereof to actuate the operator shaft and move the gate valve to open position, releasable locking means between the override structure and the outer sleeve releasable upon an outward movement of the override structure as a unit relative to the sleeve to permit detachment of the override structure from the outer sleeve, a fusible material destructible at a predetermined high temperature between the override structure and outer sleeve, at least one metering opening for the fusible material provided adjacent the fusible material, said fusible material being under compression from the outward thrust of said stem when the override structure is actuated and is maintaining the gate valve in an open position and upon reaching a predetermined high temperature fusing and flowing through said metering opening to permit said outward movement of the override structure relative to the sleeve, said releasable locking means being released upon said outward movement of the override structure to provide detachment of the override structure from said sleeve under the thrust of the valve stem and movement of the gate valve to a closed position.

2. A gate valve structure as set forth in claim 1 wherein said releasable locking means comprise a plurality of spherical ball elements received within an annular groove about the inner circumference of said sleeve, said override structure having an annular groove which is positioned adjacent the spherical ball elements upon said outward movement of the override structure to receive the spherical ball elements and thereby permit disengagement of the spherical ball elements with said sleeve.

3. A gate valve structure as set forth in claim 1 wherein said override structure includes a housing having an enlarged diameter inner end portion forming an annular shoulder, and a cap receiving the enlarged diameter end portion and positioned between said sleeve and the override structure, said cap having a central opening receiving the housing and forming an annular space between the annular shoulder and the inner circumference of the cap in which said fusible material is positioned.

* * * * *